United States Patent [19]

Brandt et al.

[11] Patent Number: 5,045,391

[45] Date of Patent: Sep. 3, 1991

[54] RELEASE COATINGS FOR DIELECTRIC SUBSTRATES

[75] Inventors: Patricia J. A. Brandt, Woodbury; Paul J. Wang, Woodbury, Raymond J. Farm, White Bear Lake, all of Minn.

[73] Assignee: Minnesota Mining and Manufacturing Company, St. Paul, Minn.

[21] Appl. No.: 483,658

[22] Filed: Feb. 23, 1990

[51] Int. Cl.$^5$ .............................................. B32B 9/04
[52] U.S. Cl. .................................... 428/336; 428/447
[58] Field of Search ............... 428/447, 448, 336, 452; 156/240; 40/594, 595, 615

[56] References Cited

U.S. PATENT DOCUMENTS

| | | | |
|---|---|---|---|
| 4,600,673 | 7/1986 | Hendrickson et al. | 430/66 |
| 4,656,087 | 4/1987 | Lubianez et al. | 428/447 |
| 4,772,526 | 9/1988 | Kan et al. | 438/90 |

FOREIGN PATENT DOCUMENTS 250248 12/1987 European Pat. Off. .
1126389 5/1989 Japan .

OTHER PUBLICATIONS

*Polymer*, vol. 25, pp. 1800–1816 12/84.

*Primary Examiner*—Merrell C. Cashion, Jr.
*Assistant Examiner*—Robert J. Follett
*Attorney, Agent, or Firm*—Gary L. Griswold; Walter N. Kirn; Carolyn V. Peters

[57] ABSTRACT

Disclosed are image release sheets which comprise a dielectric coated substrate and a silicone-urea block polymer coating for the dielectric substrate. The silicone-urea block polymer functions as a release coating when the image sheet is used in electrographic processes. Excellent transfer of an image from a donor element, comprising the silicone-urea block polymer as a release coating, to a receptor substrate occurs. In a preferred embodiment, a pH sensitive indicator such as thymolphthalein can be added to the release coating in order to monitor the thickness of the coating.

13 Claims, No Drawings

RELEASE COATINGS FOR DIELECTRIC SUBSTRATES

FIELD OF THE INVENTION

This invention relates to release coatings and more particularly, it relates to release coatings composed of silicone-urea block polymers for dielectric substrates. It also relates to donor elements for image transfer which contain a silicone-urea block polymer release coating.

BACKGROUND OF THE INVENTION

The use of electrographic processes to produce images is well known. In these processes, an electrostatic latent image is produced directly by "spraying" charge onto an accepting dielectric surface in an imagewise manner. Styli are often used to create these image patterns and are arranged in linear arrays across the width of the moving dielectric surface. The latent image is then developed on the dielectric substrate with suitable toner(s).

The term "electrography" is clearly distinguishable from "electrophotography" to those skilled in the art. As explained above, "electrography" is a process for producing images by addressing an imaging surface, normally a dielectric material, with static electric charges (e.g., as from a stylus) to form a latent image which is then developed with suitable toner(s). The term is distinguishable from "electrophotography" in which an electrostatic charge latent image is created by addressing a photoconductive surface with light. The term "electrostatic printing" and the like is commonly used in the literature and appears to encompass both electrography and electrophotography.

The electrographic process is often used to produce large size prints, which are commonly exhibited outdoors in some fashion, such as a sign on the side of a truck or a building. At the end of the electrographic process where the image has been developed on the dielectric substrate, the produced print is often enclosed between two layers of clear, vinyl plastic film and is used directly as an outdoor sign. It has been found, however, that the properties of the dielectric imaging sheet are frequently not suitable for the final image. The typical dielectric paper substrates lack the water resistance required for outdoor signs and more resistant substrates such as polyvinylchloride and polyvinylacetate films cannot be imaged directly because of their electrical and mechanical properties.

Electrophotographic processes are not practical for making large prints because the size of the typical equipment used in the electrophotographic process is rather small and therefore, the equipment cannot accommodate the production of large size prints.

In the electrophotographic process, silicones are sometimes employed as release layers on photoconductors. The silicone release layer serves to enhance the transfer of a toner image from the photoconductor to a support surface, such as a polymeric film. SYL-OFF TM 7610 silicone release agent (Dow Corning Corporation) is commonly used on photoconductor plates.

Because it would be desirable to have large outdoor signs which would be more weather resistant than the conventional ones discussed herein earlier, the desirability of transferring a produced image from a dielectric substrate to a more weather resistant receptor substrate, such as one composed of a thermoplastic polymer, has been recognized. However, until now, there have been no suitable release coatings available for dielectric substrates which work very well in the electrographic process.

Even though silicones have been used as release coatings for photoconductive processes, they do not perform well as release coatings in electrographic processes. To begin with, the cross-linked or dried silicone release coating can leach out into the toner reservoir thereby contaminating the toner. Furthermore, it has been found that the dried toner does not adhere very well to silicone release surfaces and therefore can be rubbed off during the electrographic printing process.

In the process of trying to find a release coating which would work well in the electrographic processes by overcoming the above disclosed disadvantages of silicone release coatings, Applicants discovered that silicone-urea block polymers make a very effective release coating for dielectric substrates. They do not leach out into the toner solution and contaminate it. Furthermore, the silicone-urea block polymers offer adequate release characteristics that afford good transfer of a developed image from a dielectric substrate to a durable thermoplastic receptor substrate.

The use of silicone-urea block polymers as release coatings for pressure sensitive adhesives is known; see European Patent Application No. 0/250,248. Pressure sensitive adhesives, however, are fundamentally different from dielectric coated substrates since pressure sensitive adhesives are not employed in electrostatic printing processes. In fact, the function of a release coating in a pressure sensitive adhesive is entirely different than the function of a release coating in an electrostatic printing process even when the same type of polymers are employed in the coatings. In a pressure sensitive adhesive, the release coating acts primarily as an anti-stick agent. In an electrographic process, the release coating must function to both retain toner during the charge deposition and image developing processes as well as to transfer the produced image effectively to a receptor substrate. Also, the release coating for a dielectric substrate, as opposed to one for a pressure sensitive adhesive, must be very thin, e.g., 0.05-2.0 microns, so that the dielectric properties of the substrate are not affected and high density images are achieved. Thus, the properties of release coatings in an electrographic process must be very different compared to the properties of release coatings in a pressure sensitive adhesive. This is readily apparent when one considers that whereas pure silicone polymers find acceptable use as release coatings in pressure sensitive adhesives, they do not find acceptable use as release coatings for dielectric substrates for the reasons given earlier herein.

Applicants' discovery that silicone-urea block polymers make very effective release coatings on dielectric substrates will be very important to the printing industry. For the first time that Applicants are aware of, large quality prints will now be available for use as outdoor signs without having to worry about the perennial problem of weather resistance of the substrate the image is produced on.

SUMMARY OF THE INVENTION

By the present invention, Applicants have discovered that a silicone-urea block polymer makes an excellent release coating for dielectric substrates.

Briefly, one embodiment of Applicants' invention provides an image receptor sheet comprising: (a) a substrate on which one major surface thereof is a dielectric layer; and (b) a silicone-urea block polymer coating on top of the dielectric layer of the surface of the substrate.

Also provided by the present invention is a donor element for use in transferring an image to a receptor substrate. The donor element of this invention comprises: (a) a substrate on which one major surface thereof is a dielectric layer; (b) a silicone-urea block polymer coating on top of the dielectric layer of the substrate; and (c) an image upon the silicone-urea block polymer coating.

In a preferred embodiment of the present invention, both the image release sheet and the donor element comprise a colorless pH indicator system. The pH indicator system, as explained later herein, can be used to accurately determine the thickness of the release coating, the coating thickness being an important element to control.

As will be demonstrated later herein by the examples, the silicone-urea block polymer utilized in the present invention provides an excellent release coating for dielectric substrates. The silicone-urea block polymer does not interfere with the interaction between the dielectric charges and toner charges; it provides a good medium for multiple toner deposition; and it affords excellent transfer of the image from the dielectric substrate to a receptor substrate.

DETAILED DESCRIPTION OF THE INVENTION

One embodiment of the present invention pertains to an image release sheet comprising a substrate on which one major surface thereof is a dielectric layer. A silicone-urea block polymer is on top of the dielectric layer of the substrate and functions as a release coating.

Image release sheets comprise a substrate, preferably a flexible one, on one surface of which is a dielectric layer. The substrate itself should be electroconductive or it should carry conductive layers on both major surfaces. The dielectric layer will be on the surface of one of the conductive layers.

Substrates may be chosen from a variety of materials such as cellulose fiber based paper and polyester based plastic film. If a separate conductive layer is required, this may be composed of polyelectrolytes such as cationic quaternary ammonium compounds or polymers containing a chloride anion or other materials known in the art to be stable at room temperature and at the elevated temperatures (e.g., 230° to 270° F.) of the image transfer process.

Dielectric layers on a substrate for use in electrostatic printing processes are well known in the art; see, for example, *Neblette's Handbook of Photography and Reprography*, C. B. Neblette, 7th Edition, 1977. These layers commonly comprise polymers selected from polyvinylacetate, polyvinylchloride, polyvinylbutyral, and polymethylmethacrylate. Other ingredients may be chosen from waxes, polyethylene, alkyd resins, nitrocellulose, ethylcellulose, cellulose acetate, epoxy resins, styrene-butadiene polymers, chlorinated rubbers, and polyacrylates.

Performance criteria for dielectric layers are listed in the foregoing Neblette reference. Such layers are also described in U.S. Pat. Nos. 3,075,859; 3,920,880; 4,201,701; and 4,208,467. The layers should have a thickness in the range of from 1 to 20 microns and preferably in the range of 5 to 15 microns. The surface of such dielectric layers are advantageously rough to ensure good transfer of charge during the passage under the stylus bar. This roughness can be obtained by including in the layer particles sufficiently large to give surface irregularities to the layer. Particles in the diameter range of 1 to 5 microns are suitable. Particle composition is chosen to give the required dielectric constant to the layer. These property requirements of the dielectric layer are well known in the art. See, for example, U.S. Pat. Nos. 3,920,880 and 4,201,701.

A silicone-urea block polymer is applied as a coating on top of a dielectric layer on one major surface of the substrate. As used herein, a silicone-urea block polymer refers to a polymer comprising repeating blocks of siloxane units, e.g.,

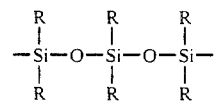

and repeating blocks of segments which contain urea linkages, e.g.,

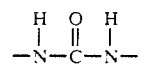

wherein R is typically an alkyl or aryl radical or combinations thereof.

One skilled in the art will recognize that the terms "siloxane" and "urea" encompass structures which may differ slightly than those given by way of example above. For example, the urea linkages might encompass urea-urethane linkages. As used herein, the term "silicone-urea block polymer" refers not only to copolymers but also to terpolymers or higher polymers, e.g., block polymers of silicone, urea, and polypropylene oxide with terminal diamine groups.

Generally, the silicone content of the block polymer will be in the range of 1-65 wt %, preferably 5-15 wt %, and most preferably 10 wt %, based upon the total weight of the block polymer.

The preferred block polymers utilized in the present invention has the following formula:

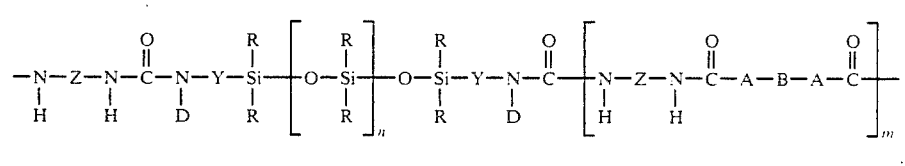

wherein:

Z is a divalent radical selected from the group consisting of phenylene, alkylene, aralkylene and cycloalkylene; Z is preferably selected from the group consisting of hexamethylene; methylene bis-(phenylene); isophorone; tetramethylene; cyclohexylene; and methylene dicyclohexylene; and most preferably is isophorone;

Y is an alkylene radical of 1 to 10 carbon atoms; preferably Y is propylene;

R is at least 50% methyl with the balance of the 100% of all R radicals being selected from the group consisting of methyl, a monovalent alkyl radical having from 2 to 12 carbon atoms, a vinyl radical, a phenyl radical, and a substituted phenyl radical; preferably R is methyl or a monovalent alkyl radical having from 2 to 12 carbon atoms; and most preferably R is methyl;

D is selected from the group consisting of hydrogen, and an alkyl radical of 1 to 10 carbon atoms; preferably D is hydrogen;

B is selected from the group consisting of alkylene, aralkylene, cycloalkylene, azaalkylene, cycloazaalkylene, phenylene, polyalkylene oxides, polyethylene adipate, polycaprolactone, polybutadiene, a radical completing a ring structure including A to form a heterocycle and mixtures thereof; preferably B is a polyalkylene oxide, or a radical completing a ring structure including A to form a heterocycle or mixtures thereof;

A is selected from the group consisting of

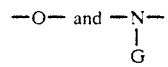

where G is selected from the group consisting of hydrogen, an alkyl radical of 1 to 10 carbon atoms, phenyl, a radical which completes a ring structure including B to form a heterocycle and mixtures thereof; preferably G is hydrogen, a radical which forms a ring structure including B to form a heterocycle or mixtures thereof;

n is an integer which is 4 or larger, preferably 65 or larger;

m is an integer which is from zero to 25.

As used herein, the term "radical" includes organic radicals which are substituted as well as unsubstituted, e.g., halo- or CN-substituted radicals.

Silicone-urea block polymers are known in the art and may be prepared by any suitable method such as condensation polymerization. The preferred silicone-urea block polymers of the present invention may be prepared by the condensation polymerization of the components disclosed below. Generally, the polymerization reaction is carried out in an alcohol based solvent, such as isopropanol, at room temperature, preferably under an inert atmosphere such as $N_2$.

The reactive components comprise:

(1) a diamine having a number average molecular weight silicone of at least 500 and a structure represented by the following formula:

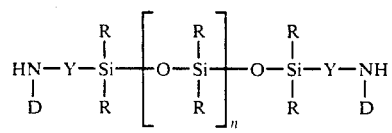

wherein R, Y, D and n are as defined herein earlier;

(2) at least one diisocyanate having a structure represented by the following formula:

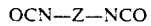

wherein Z is as defined herein earlier; and (3) optionally, up to 95 weight percent of a component selected from the group of diamines, dihydroxy chain extenders, and mixtures thereof having a structure represented by the following formula:

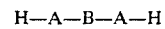

wherein A and B are as defined herein earlier.

The combined molar ratio of silicone diamine of (1) above and diamine and/or dihydroxy chain extender (when used) of (3) above to the diisocyanate of (2) above in the reaction is preferably maintained in the range of about 1:0.95 to 1:1.05, and most preferably is about 1:1.

In a preferred embodiment of the present invention, the silicone-urea block polymer prepared by condensation polymerization will comprise segments of polydimethysiloxane (PDMS); dipiperidyl propane (DIPIP)/isophorone diisocyanate (IPDI), and polypropylene oxide (PPO) with terminal diamine groups. The preferred combinations (in weight percent) of PDMS, DIPIP/IPDI, and PPO, based upon the total weight of the silicone-urea block polymer, are as follows:

| PDMS | DIPIP/IPDI | PPO |
|------|------------|-----|
| 5    | 75         | 20  |
| 10   | 75         | 15  |
| 15   | 75         | 10  |
| 20   | 75         | 5   |
| 50   | 50         | 0   |

As illustrated by the examples later herein, the foregoing combinations are preferred as they have been found to provide excellent transfer of quality images when used as release coatings on a dielectric substrate in an electrographic process. Polymers with a PDMS content of 10 wt % are most preferred.

The donor element of the present invention may be prepared by a variety of techniques. The dielectric surface to be treated must first be cleaned of all dirt and grease. The dielectric surface is then contacted with the solution of silicone urea block polymer by the use of one of a variety of techniques such as brushing, bar coating, spraying, roll coating, curtain coating, knife coating, etc.; and then processed at a time and temperature sufficient to cause the silicone urea block polymer to form a dried layer on the surface. For image release coatings, a preferable level of measurement for dried coating thickness is in micron(s) thickness. A suitable range is 0.05 to 2.0 microns, preferably in the range of 0.06 to 0.3 microns, and most preferably in the range of 0.07 to 0.18 microns.

The silicone urea block polymer release coating used in the present invention must be applied to the dielectric substrate in an organic, non-aqueous, solvent. If the coating is applied in an aqueous solution, the water is removed upon drying of the coating leaving the polar non-silicone segments on the surface, and the silicone is left almost totally submerged under the polar non-silicone layer. Therefore, an insufficient quantity of silicone is left on the surface of the release layer for contact with the toner(s). Consequently, there is no toner release capability upon attempted transfer of an image from the dielectric substrate to a receptor substrate.

The non-aqueous polymer solution is diluted in a solvent, such as isopropanol, to give a proper solids concentration and then is coated onto the dielectric material. The thickness of the coating once it is dried can be properly measured by a chemical indicator method if the proper indicator is included within the non-aqueous release material prior to application to the dielectric material.

The latent image is deposited on the release coating by one or more stylus and subsequently toner is applied to the deposited image at one or more toning stations. At this point, the donor element has been created.

In a preferred embodiment of the present invention, a colorless pH indicator, preferably thymolphthalein, is added (not more than 5% of the solid level of the silicone-urea polymer) to the non-aqueous silicone urea block polymer. This colorless indicator is converted to its blue colored form by an alkaline solution prior to spectrophotometric measurements and calculations.

A requirement of the release coating used in the present invention is that it must be a very thin coating, e.g., 0.05–2.0 microns, in order that high density images may be developed between the toner(s) and the dielectric material. The function of the indicator is to monitor the submicron range coating thickness of the silicone urea block polymer. The coating thickness of the silicone urea block polymer, which is proportional to the amount of indicator, is calculated from a color developed alkaline solution by the absorbance measurements. The indicator within the silicone urea block polymer coating must not only be colorless but must remain in a stable colorless state at neutral pH conditions when applied on the dielectric material. Furthermore, this colorless indicator material must not interfere with image printing, transfer, or aging of transferred image.

Other indicators may perform as well as the preferred indicator thymolphthalein and these would include m-nitrophenol, o-cresolphthalein, phenolphthalein, and ethyl bis(2,4-dinitrophenyl) acetate. Other classes of indicators which should function as well are those which respond by oxidation-reduction.

The donor element of this invention may be used to transfer the image, typically with heat or under a vacuum, to a receptor substance such as a thermoplastic material.

The following non-limiting examples further illustrate the present invention.

In Examples 1–6 below, all the polymerization reactions were carried out under $N_2$ atmospheric conditions.

Block Polymer Example 1

To a solution of 0.38 gm of 5000 number average molecular weight polydimethylsiloxane (PDMS) diamine, 1.50 gm of 800 number average molecular weight polypropylene oxide (PPO) with terminal diamine groups and 2.52 gm of dipiperidyl propane (DIPIP) in 242.50 gm of isopropyl alcohol (IPA) at 25° C., was added 3.10 gm of isophorone diisocyanate (IPDI) slowly over a 5 minute period. The viscosity rose rapidly toward the end of the addition and the viscous yet clear reaction solution was stirred for an additional 15 minutes. This provided a 3% by weight solution of the block polymer in IPA. The block polymer had 5% by weight PDMS, 75% by weight DIPIP/IPDI, and 20% by weight PPO.

Block Polymer Example 2

To a solution of 15.00 gm of 5000 number average molecular weight polydimethylsiloxane (PDMS) diamine, 22.50 gm of 800 number average molecular weight polypropylene oxide (PPO) with terminal diamine groups and 51.33 gm of dipiperidyl propane (DIPIP) in 1470 gms of isopropyl alcohol (IPA) at 25° C, was added 61.17 gm of isophorone diisocyanate (IPDI) slowly over a 5 minute period. The viscosity rose rapidly toward the end of the addition and the viscous yet clear reaction was stirred for an additional 30 min. This provided a 10 percent by weight solution of the block polymer in IPA. To prepare a 3% solids solution, 3380 g of IPA was added to the 10% solids solution and stirred until homogeneous. The block polymer had 10% by weight PDMS, 75% by weight DIPIP/IPDI, and 15% by weight PPO.

Block Polymer Example 3

To a solution of 1.13 gm of 5000 number average molecular weight polydimethylsiloxane (PDMS) diamine, 0.75 gm of 800 number average molecular weight polypropylene oxide (PPO) with terminal diamine groups and 2.61 gm of dipiperidyl propane (DIPIP) in 242.5 gm of isopropyl alcohol (IPA) at 25° C., was added 3.02 gm of isophorone diisocyanate (IPDI) slowly over a 5 minute period. The viscosity rose rapidly toward the end of the addition and the viscous yet clear reaction solution was stirred for an additional 15 minutes. This provided a 3% by weight solution of the block polymer in IPA. The block polymer had 15% by weight PDMS, 75% by weight DIPIP/IPDI, and 10% by weight PPO.

Block Polymer Example 4

To a solution of 1.50 gm of 5000 number average molecular weight polydimethylsiloxane (PDMS) diamine, 0.38 gm of 800 number average molecular weight PPO with terminal diamine groups and 2.65 gm of dipiperidyl propane (DIPIP) in 242.5 gm of isopropyl alcohol (IPA) at 25° C. was added 2.97 gm of isophorone diisocyanate (IPDI) slowly over a 5 minute period. The viscosity rose rapidly toward the end of the addition and the viscous yet clear reaction solution was stirred for an additional 15 minutes. This provided a 3% by weight solution of the block polymer in IPA. The block polymer had 20% by weight PDMS, 75% by weight DIPIP/IPDI, and 5% by weight PPO.

Block Polymer Example 5

To a solution of 3.75 gm of 5000 number average molecular weight polydimethylsiloxane (PDMS) diamine and 1.74 gm of dipiperidyl propane (DIPIP) in 242.5 gm of isopropyl alcohol (IPA) at 25° C., was added 2.01 gm of isophorone diisocyanate (IPDI) slowly over a 5 minute period. The viscosity rose rapidly toward the end of the addition and the viscous yet clear reaction solution was stirred for an additional 15 minutes. This provided a 3% by weight solution of the block polymer in IPA. The block polymer had 50% by weight PDMS and 50% by weight DIPIP/IPDI.

When used as inventive release coatings on dielectric paper (James River Graphics No. 2089) in an electrographic process, the silicone-urea block polymers of Examples 1–5 were all very functional and provided for clear images on transfer. The block polymer of Example 2, where PDMS is present at 10 wt %, provided the best results. The thickness of the surface coatings was in the range of 0.05–2.0 microns.

Block Polymer Example 6

To a solution of 1.88 gm of 800 number average molecular weight polypropylene oxide with terminal diamine groups (PPO) and 2.48 gm of dipiperidyl propane (DIPIP) in 242.5 gm of isopropyl alcohol (IPA) at 25° C. was added 3.14 gm of isophorone diisocyanate (IPDI) slowly over a 5 minute period. The viscosity rose rapidly toward the end of the addition and the viscous yet clear reaction solution was stirred for an additional 15 minutes. This provided a 3% by weight solution of the block polymer in IPA. The block polymer had 75% by weight DIPIP/IPDI and 25% by weight PPO.

No image transfer occurred when the above non-silicone containing block polymer was used as a release coating on dielectric paper in an electrographic process. The non-silicone containing block polymer utilized in this example was outside the scope of silicone-urea block polymers utilized in the present invention because no silicone was present in the release coating.

Block Polymer Example 7

To a solution of 65 gm of 5000 number average molecular weight polydimethylsiloxane (PDMS) diamine and 15.5 grams bisaminopropylpiperazine (bisAPIP) in 400 grams of isopropyl alcohol (IPA) at 25° C., was added 19.5 gm of isophorone diisocyanate (IPDI) slowly over a 5 minute period. The viscosity rose rapidly toward the end of the addition and the viscous yet clear reaction solution was stirred for an additional 1 hour. This provided a 20% by weight solution of the block polymer in IPA. The block polymer had 65% by weight PDMS and 35% by weight bisAPIP/IPDI.

Block Polymer Example 8

To a solution of 5 gm of 5000 number average molecular weight PDMS diamine, 1.29 gm of bisAPIP, 0.56 gm of methylpentamethylene diamine (MPMD) and 90 gm of isopropyl alcohol, 2.76 gm of IPDI was added. This provided the silicone-urea polymer as a very viscous, yet clear solution, in IPA. This provided a 10% by weight solution of the block polymer in IPA. The block polymer had 52 weight percent PDMS, 35 weight percent bisAPIP/IPDI, and 13 weight percent MPMD.

Even though the images produced were somewhat fuzzy, the silicone-urea block polymers of Examples 7 and 8 above produced adequate transfer of the image when used as release coatings on dielectric coated paper in an electrographic process. The thickness of the surface coating was in the range of 0.05–2.0 microns.

Block Polymer Example 9

To a solution of 4.0 gm of 10000 number average molecular weight polydimethylsiloxane (PDMS) diamine, 1.00 gm of 900 number average molecular weight polypropylene oxide (PPO) with terminal diamine groups and 2.21 gm of bisaminopropylpiperizine (bisAPIP) in 70.0 gm of isopropyl alcohol (IPA) at 25° C., was added 2.79 gm of isophorone diisocyanate (IPDI) slowly over a 5 minute period. The reaction mixture was stirred for 10 minutes, then acidified with 6N HCl (1.43 ml) to make the reaction mixture water dispersable. Next the reaction mixture was dispersed in 120 gm of warm water. This provided a 5% by weight solution of the block polymer in IPA/H$_2$O. The block polymer had 40 percent by weight PDMS, 50 percent by weight bisAPIP/IPDI, and 10 percent by weight PPO.

Upon attempted transfer of the image using the aqueous solution of block polymer of Example 9 as a release coating on dielectric paper in an electrographic process, no release occurred. This was because the block polymer produced was water dispersed and when it was applied as a coating to a dielectric substrate and dried, the silicone was left submerged underneath the non-silicone segment. Therefore, the silicone was unable to participate effectively as part of the release coating.

Example 10

A series of release coating formulations were made each of which employed one of the block polymers as prepared in Examples 7 and 8. Each of the above-described polymer solutions were treated with HCl, then diluted to a 3% polymer solution in water to make the polymers water dispersed. Upon attempted transfer of an image using the aqueous solutions of block polymers as prepared in Examples 7 and 8 as release coatings on dielectric paper in an electrographic process, no release occurred. This was because the block polymers produced were water dispersed and when they were applied as a coating to a dielectric substrate and dried, the silicone was left submerged below the non-silicone segment. Therefore, the silicone was unable to participate effectively as part of the release coating.

Reasonable modifications and variations are possible from the foregoing disclosure without departing from either the spirit or scope of the invention as defined in the claims.

We claim:
1. An image release sheet comprising:
   (a) a substrate on which one major surface thereof is a dielectric-layer; and
   (b) a silicone-urea block polymer coating on top of said dielectric layer, said coating being sufficiently thin so as to not substantially affect the dielectric properties of said substrate, said block polymer having a weight percent of 1–65 weight percent of silicone, and represented by the formula:

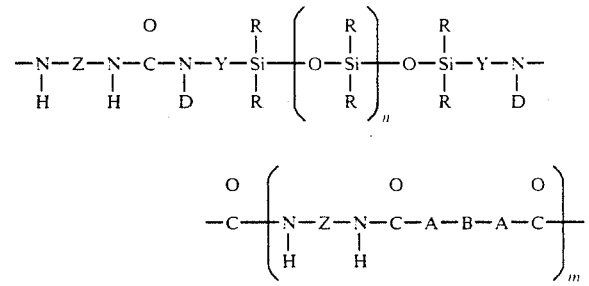

wherein:
   Z is a divalent radical selected from the group consisting of phenylene, alkylene, aralkylene and cycloalkylene;
   Y is an alkylene radical of 1 to 10 carbon atoms;
   R is at least 50% methyl with the balance of the 100% of all R radicals being selected from the group consisting of methyl and a monovalent alkyl radical having from 2 to 12 carbon atoms, a vinyl radical, a phenyl radical, and a substituted phenyl radical;

D is selected from the group consisting of hydrogen, and an alkyl radical of 1 to 10 carbon atoms;

B is selected from the group consisting of alkylene, aralkylene, cycloalkylene, azaalkylene, cycloazaalkylene, phenylene, polyalkylene oxides, polyethylene adipate, polycaprolactone, polybutadiene, a radical completing a ring structure including A to form a heterocycle and mixtures thereof;

A is selected from the group consisting of

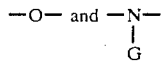

where G is selected from the group consisting of hydrogen, an alkyl radical of 1 to 10 carbon atoms, phenyl, a radical which completes a ring structure including B to form a heterocycle and mixtures thereof;

n is an integer which is 4 or larger; and m is an integer which is zero to 25.

2. An image release sheet according to claim 1 wherein:
Z is selected from the group consisting of hexamethylene; methylene bis-(phenylene); isophorone; tetramethylene; cyclohexylene; and methylene dicyclohexylene;
Y is propylene;
R is methyl or a monovalent alkyl radical having 2 to 12 carbon atoms;
D is hydrogen;
B is a polyalkylene oxide, a radical completing a ring structure including A to form a heterocycle or mixtures thereof;
G is hydrogen, a radical which forms a single structure including B to form a heterocycle or mixtures thereof; and
n is an integer which is 65 or larger.

3. An image release sheet according to claim 2 wherein Z is isophorone and R is methyl.

4. An image release sheet according to claim 1 wherein the thickness of said silicone-urea block polymer is in the range of 0.05 to 2.0 microns.

5. An image release sheet according to claim 1 further comprising a pH indicator.

6. An image release sheet according to claim 1 wherein said silicone-urea block polymer coating was originally applied to the top of said dielectric layer in a non-aqueous solvent and subsequently dried.

7. A donor element comprising:
(a) a substrate on which one major surface thereof is a dielectric layer; and
(b) a silicone-urea block polymer coating on top of said dielectric layer, said coating being sufficiently thin so as to hot substantially affect the dielectric properties of said substrate, said block polymer having a weight percent of 1-65 weight percent of silicone; and
represented by the formula:

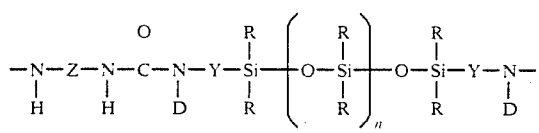

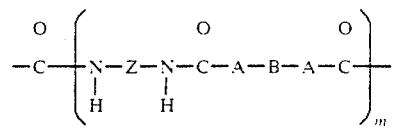

where:
Z is a divalent radical selected from the group consisting of phenylene, alkylene, aralkylene and cycloalkylene;
Y is an alkylene radical of 1 to 10 carbon atoms;
R is at least 50% methyl with the balance of the 100% of all R radicals being selected from the group consisting of methyl and a monovalent alkyl radical having from 2 to 12 carbon atoms, a vinyl radical, a phenyl radical, and a substituted phenyl radical;
D is selected from the group consisting of hydrogen and an alkyl radical of 1 to 10 carbon atoms;
B is selected from the group consisting of alkylene, aralkylene, cycloalkylene, azaalkylene, cycloazaalkylene, phenylene, polyalkylene oxides, polyethylene adipate, polycaprolactone, polybutadiene, a radical completing a ring structure including A to form a heterocycle and mixtures thereof;
A is selected from the group consisting of

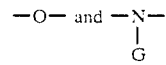

where G is selected from the group consisting of hydrogen, an alkyl radical of 1 to 10 carbon atoms, phenyl, a radical which completes a ring structure including B to form a heterocycle and mixtures thereof;

n is an integer which is 4 or larger; and m is an integer which is zero to 25.

8. A donor element according to claim 7 wherein:
Z is selected from the group consisting of hexamethylene; methylene bis-(phenylene); isophorone; tetramethylene; cyclohexylene; and methylene dicyclohexylene;
Y is propylene;
R is methyl or a monovalent alkyl radical having 2 to 12 carbon atoms;
D is hydrogen;
B is a polyalkylene oxide, a radical completing a ring structure including A to form a heterocycle or mixtures thereof;
G is hydrogen, a radical which forms a single structure including B to form a heterocycle or mixtures thereof; and
n is an integer which is 65 or larger.

9. A donor element according to claim 8 wherein Z is isophorone and R is methyl.

10. A donor element according to claim 7 wherein the thickness of said silicone-urea block polymer is in the range of 0.05 to 2.0 microns.

11. A donor element according to claim 10 further comprising a pH indicator.

12. A donor element according to claim 11 wherein the pH indicator is thymolphthalein.

13. A donor element according to claim 7 wherein said silicone-urea block polymer coating was originally applied to the top of said dielectric layer in a non-aqueous solvent and subsequently dried.

* * * * *

UNITED STATES PATENT AND TRADEMARK OFFICE
CERTIFICATE OF CORRECTION

PATENT NO. : 5,045,391

DATED : September 3, 1991

INVENTOR(S) : Brandt et al.

It is certified that error appears in the above-identified patent and that said Letters Patent is hereby corrected as shown below:

Col. 11, line 57, "hot" should read --not--.

Col. 12, line 15, insert a comma after the word "methyl" and delete the word "and"

Signed and Sealed this

Twenty-third Day of March, 1993

Attest:

STEPHEN G. KUNIN

*Attesting Officer*     Acting Commissioner of Patents and Trademarks